(12) United States Patent
Hackenschmied et al.

(10) Patent No.: US 9,753,154 B2
(45) Date of Patent: Sep. 5, 2017

(54) X-RAY DETECTOR

(71) Applicant: Siemens Aktiengesellschaft, Munich (DE)

(72) Inventors: Peter Hackenschmied, Nuremberg (DE); Christian Schröter, Bamberg (DE); Matthias Strassburg, Berlin (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 14/458,411

(22) Filed: Aug. 13, 2014

(65) Prior Publication Data
US 2015/0060677 A1 Mar. 5, 2015

(30) Foreign Application Priority Data

Sep. 3, 2013 (DE) .................. 10 2013 217 528

(51) Int. Cl.
*G01T 1/24* (2006.01)
*G01T 1/208* (2006.01)
*G01T 1/20* (2006.01)
*G01T 1/29* (2006.01)

(52) U.S. Cl.
CPC ............ *G01T 1/208* (2013.01); *G01T 1/2002* (2013.01); *G01T 1/2018* (2013.01); *G01T 1/247* (2013.01); *G01T 1/2928* (2013.01)

(58) Field of Classification Search
CPC .. H04N 5/32; G01T 1/247; G01T 1/20; G01T 1/24; G01T 1/208
USPC .......................................................... 250/366
See application file for complete search history.

(56) References Cited

U.S. PATENT DOCUMENTS

| | | | |
|---|---|---|---|
| 7,283,608 B2 * | 10/2007 | Hoffman | 378/19 |
| 7,696,481 B2 * | 4/2010 | Tkaczyk | 250/363.02 |
| 9,119,589 B2 * | 9/2015 | Zou | A61B 6/032 |
| 2005/0104000 A1 * | 5/2005 | Kindem | G01T 1/1644 250/361 R |
| 2005/0285043 A1 * | 12/2005 | Nascetti et al. | 250/370.09 |
| 2007/0147574 A1 | 6/2007 | Bernard De Man et al. | |
| 2007/0205367 A1 | 9/2007 | Deman et al. | |
| 2009/0314947 A1 * | 12/2009 | Goushcha et al. | 250/363.01 |
| 2012/0300896 A1 | 11/2012 | Flohr et al. | |

(Continued)

FOREIGN PATENT DOCUMENTS

DE 102011076351 A1 8/2012
DE 102011076346 A1 11/2012

(Continued)

OTHER PUBLICATIONS

Office Action for German Patent Application No. 10 2013 217 528.0 dated May 26, 2015.

*Primary Examiner* — Marcus Taningco
(74) *Attorney, Agent, or Firm* — Harness, Dickey & Pierce, P.L.C.

(57) ABSTRACT

An X-ray detector is disclosed, in particular for a computed tomography system. In an embodiment, the X-ray detector includes a regular arrangement of measuring pixels for covering a measuring surface. A plurality of the measuring pixels of the regular arrangement are constructed as direct converting measuring pixels, and remaining ones of the measuring pixels are constructed as indirect converting measuring pixels.

23 Claims, 3 Drawing Sheets

(56) References Cited

U.S. PATENT DOCUMENTS

| | | | |
|---|---|---|---|
| 2012/0300897 A1 | 11/2012 | Flohr et al. | |
| 2012/0301002 A1 | 11/2012 | Flohr et al. | |
| 2013/0206994 A1* | 8/2013 | Kaufmann et al. | 250/366 |
| 2014/0138547 A1* | 5/2014 | Chambers | 250/362 |
| 2014/0328465 A1* | 11/2014 | Herrmann | 378/62 |
| 2015/0338529 A1* | 11/2015 | Svenonius | G01T 1/2002 250/486.1 |

FOREIGN PATENT DOCUMENTS

| | | |
|---|---|---|
| DE | 102011076358 A1 | 11/2012 |
| WO | WO-2008135897 A2 | 11/2008 |

\* cited by examiner

X-RAY DETECTOR

PRIORITY STATEMENT

The present application hereby claims priority under 35 U.S.C. §119 to German patent application number DE 102013217528.0 filed Sep. 3, 2013, the entire contents of which are hereby incorporated herein by reference.

FIELD

At least one embodiment of the invention generally relates to an X-ray detector, in particular for a computed tomography system, having a regular arrangement of measuring pixels for covering a measuring surface.

BACKGROUND

Integrating X-ray detectors based on scintillators, also called indirect converting X-ray detectors, are currently used in a wide variety of fields of application, such as in medical technology. One fundamental drawback of such X-ray detectors is the limited temporal resolution of the X-ray radiation intensity owing to what is known as afterglow. In addition the individual pixels usually have to be separated from each other by walls, wherein what are known as dead zones are created by the walls and therefore by the separating material. It is precisely in the case of isotropic ceramic scintillators that the production of appropriate ceramic pixels together with the separating elements, i.e. the walls, is relatively costly and the smallest possible pixel size, and therewith the maximum spatial resolution, of the X-ray detector is currently limited to about 500 µm.

What are known as direct converting X-ray detectors represent an alternative which, compared to the indirect converting X-ray detectors with scintillators, exhibit a higher attainable spatial and temporal resolution. One drawback of direct converting X-ray detectors however is the fact that they are affected by phenomena of polarization, and this leads to a reduction in an externally applied electrical field as a function of time and radiation intensity, and therefore to inconstant detector performance.

SUMMARY

An advantageous X-ray detector is disclosed.

Some of the related claims include advantageous developments and some of them inventive developments of this invention for themselves.

The X-ray detector of an embodiment is, in this connection, designed in particular for a computed tomography system and comprises a regular arrangement of measuring pixels for covering a measuring surface. The regular arrangement has two different types of measuring pixel in such a way that a plurality of measuring pixels of the regular arrangement is constructed as direct converting measuring pixels and the remaining measuring pixels are constructed as indirect converting measuring pixels. Instead of using either the indirect converting or the direct converting measuring principle to detect X-ray radiation as previously therefore, in the case of an X-ray detector presented here, also called a detector for short below, the two measuring principles are used simultaneously.

BRIEF DESCRIPTION OF THE DRAWINGS

Example embodiments of the invention will be explained in more detail below with reference to a schematic drawing, in which.

Mutually corresponding parts are provided with the same reference numerals respectively in all figures.

DETAILED DESCRIPTION OF THE EXAMPLE EMBODIMENTS

Figure 1:
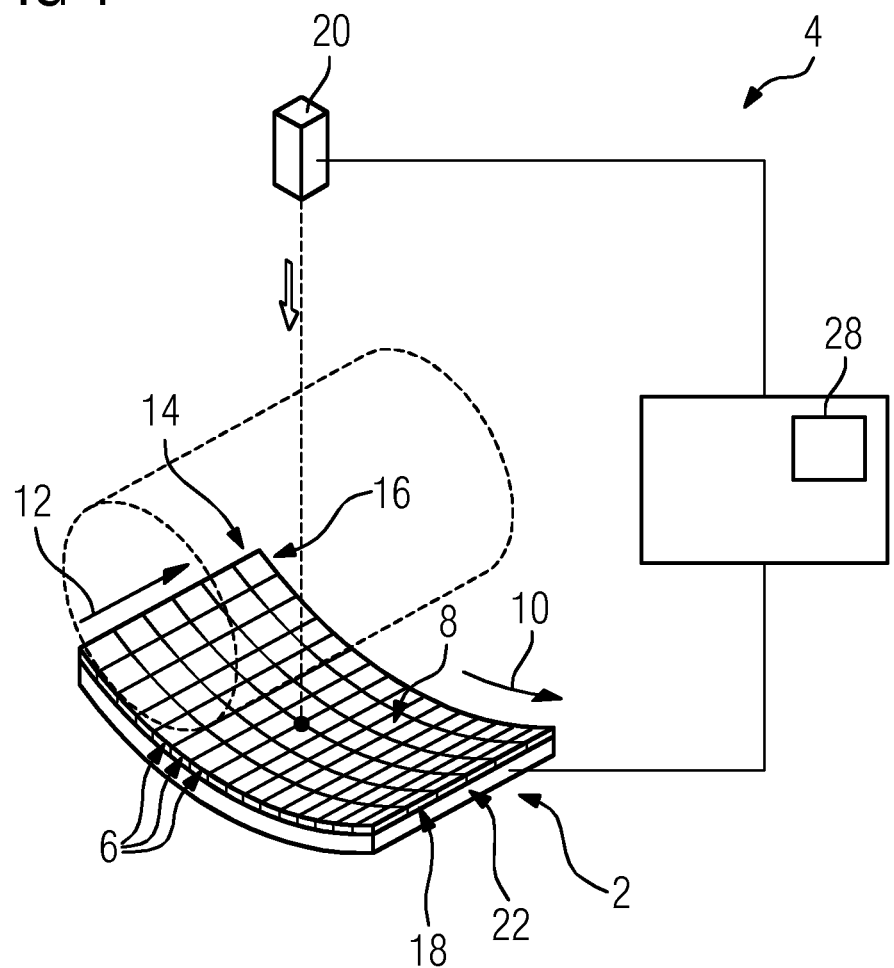
FIG. 1 shows a CT scanner in a perspective view with an X-ray detector.

Various example embodiments will now be described more fully with reference to the accompanying drawings in which only some example embodiments are shown. Specific structural and functional details disclosed herein are merely representative for purposes of describing example embodiments. The present invention, however, may be embodied in many alternate forms and should not be construed as limited to only the example embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the present invention to the particular forms disclosed. On the contrary, example embodiments are to cover all modifications, equivalents, and alternatives falling within the scope of the invention. Like numbers refer to like elements throughout the description of the figures.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed below, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks will be stored in a machine or computer readable medium such as a storage medium or non-transitory computer readable medium. A processor(s) will perform the necessary tasks.

Specific structural and functional details disclosed herein are merely representative for purposes of describing example embodiments of the present invention. This invention may, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments may be described with reference to acts and symbolic representations of operations (e.g., in the form of flowcharts) that may be implemented as program modules or functional processes include routines, programs, objects, components, data structures, etc., that perform particular tasks or implement particular abstract data types and may be implemented using existing hardware at existing network elements. Such existing hardware may include one or more Central Processing Units (CPUs), digital signal processors (DSPs), application-specific-integrated-circuits, field programmable gate arrays (FPGAs) computers or the like.

Note also that the software implemented aspects of the example embodiments may be typically encoded on some form of program storage medium or implemented over some type of transmission medium. The program storage medium (e.g., non-transitory storage medium) may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The example embodiments not limited by these aspects of any given implementation.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

The X-ray detector of an embodiment is, in this connection, designed in particular for a computed tomography system and comprises a regular arrangement of measuring pixels for covering a measuring surface. The regular arrangement has two different types of measuring pixel in such a way that a plurality of measuring pixels of the regular arrangement is constructed as direct converting measuring pixels and the remaining measuring pixels are constructed as indirect converting measuring pixels. Instead of using either the indirect converting or the direct converting measuring principle to detect X-ray radiation as previously therefore, in the case of an X-ray detector presented here, also called a detector for short below, the two measuring principles are used simultaneously.

Advantages of the two measuring principles may therefore be combined in this way and the respective drawbacks be at least partially compensated. The detector consequently then provides the opportunity of detecting extremely varying X-ray radiation intensities, with this being made possible by the indirect converting measuring pixels, and the detector also provides a high spatial resolution and an at least reduced number of dead zones, and this in turn is due to the use of direct converting measuring pixels. Energy-resolving detection of X-ray radiation is also possible, moreover, with the aid of the direct converting measuring pixels.

The indirect converting measuring pixels are preferably constructed according to a principle that is known per se and therefore have a scintillator layer made from a conventional ceramic scintillator material. A construction that is known per se is also preferred for the direct converting measuring pixels and therefore a conventional material such as $Cd_xZn_{1-x}Te_ySe_{1-y}$ ($0.9<x<1$; $0.9<y<1$), $Cd_xMn_{1-x}Te_ySe_{1-y}$ ($0.9<x<1$; $0.9<y<1$), $In_xGa_{1-x}As_yP_{1-y}$ ($0<x<1$; $0<y<1$) or $In_xGa_{1-x}As_yN_{1-y}$ ($0<x<1$; $0<y<1$) is provided for the semiconductor layer that absorbs the X-ray radiation.

The direct converting measuring pixels and the indirect converting measuring pixels are also preferably arranged in a periodic sequence. One variant of the X-ray detectors is designed by way of example in such a way that the direct converting and the indirect converting measuring pixels are arranged in the manner of a chessboard pattern.

This detector may then, in an embodiment, also preferably used in a computed tomography system to generate image data, wherein, according to one variant that is also preferred, in each case one measuring pixel pair comprising a direct converting measuring pixel and an indirect converting measuring pixel acts as an image pixel or a measuring pixel base unit. It is assumed in this connection that owing to the physical proximity of the two measuring pixels of a measuring pixel pair the two measuring pixels are substantially always irradiated with X-ray radiation in the same way, so virtually the same measurement is made with two different measuring pixels, i.e. with an indirect converting measuring pixel and with a direct converting measuring pixel.

Alternatively, in particular if optimally high resolution is desired, all measuring pixels are used as the image pixels or as the measuring pixel base unit, wherein in this case the measuring signals of the direct converting measuring pixels are additionally used, i.e. in addition to the generation of image data known per se, to determine correction values which are taken into account during measuring signal evaluation of the indirect converting measuring pixels, and vice versa.

An embodiment of the X-ray detector in which a plurality of measuring pixels is mounted side by side in a row direction to form a measuring pixel row is also advantageous in particular, wherein in any measuring pixel row only measuring pixels of the same type are mounted side by side, and in which a plurality of measuring pixels is mounted side by side in a column direction orthogonal to the row direction to form the regular arrangement of measuring pixels. This variant of the X-ray detectors is relatively easy to achieve in terms of manufacturing technology, at least compared to a design with a chessboard-like arrangement of direct converting and indirect converting measuring pixels. If an X-ray detector, which is configured in this way, for a computed tomography system is provided with a measuring surface that is not flat, then the row direction is preferably chosen such that it is identical to what is referred to as the phi direction, and the column direction is then identical to what is referred to as the z direction accordingly.

A variant is expedient in which, viewed in the column direction, the measuring pixel rows with direct converting measuring pixels and measuring pixel rows with indirect converting measuring pixels are arranged in a periodic sequence in such a way that in each case a measuring pixel row with measuring pixels of the first type follows a predetermined number of measuring pixel rows with measuring pixels of the second type. Consequently it may be achieved by way of example that an equally large portion of the measuring surface is covered by the measuring pixels of the two types even if the measuring pixels of the two types have different dimensions.

As an alternative to this the measuring pixel rows are arranged in a periodic sequence in which in each case following a predetermined number of measuring pixel rows with measuring pixels of the first type is the same number of measuring pixel rows with measuring pixels of the second type. This means therefore that, viewed in the column direction, in each case a plurality of measuring pixel rows follows each other which comprises solely measuring pixels of the same type. Larger surface areas of the measuring surface are therefore always covered by measuring pixels of the same type and, viewed over the whole measuring surface, there are therefore fewer transitions between direct converting and indirect converting measuring pixels so the technical effort required for the manufacture of a corresponding X-ray detector is manageable.

Finally, an embodiment of the X-ray detector is advantageous in which, viewed in the column direction, measuring pixel rows with direct converting measuring pixels and measuring pixel rows with indirect converting measuring pixels are mounted side by side so as to alternate in the column direction. This variant requires greater manufacturing effort but a particularly pronounced positive effect may be expected in this case as well as a result of the combination of the two measuring principles.

It is also advantageous if the direct converting measuring pixels and the indirect converting measuring pixels have the same dimensions in the row direction. A corresponding variant of the X-ray detector is provided in particular for use in a computed tomography system, wherein the measuring pixels are mounted side by side in the row direction on the one hand and in the column direction on the other hand and therefore form measuring pixel rows and measuring pixel columns orthogonal thereto. In an advantageous development the direct converting and the indirect converting measuring pixels have the same dimensions in the row direction and in the column direction. The same portion of the measuring surface is therefore covered by any measuring pixel irrespective of measuring pixel type and consequently the measuring signals of two adjacent measuring pixels, i.e. of a direct converting measuring pixel and of an indirect converting measuring pixel, may be related more easily by way of example.

In order to be able to detect X-ray radiation striking over the whole measuring surface as extensively as possible, i.e.

to keep the proportion of dead zones as low as possible, the measuring pixels preferably have a detector layer and a signal processing layer with an application-specific integrated circuit (ASIC), wherein the signal processing layer is positioned beneath the detector layer, i.e. on the side remote from the X-ray radiation source. The read-out electronic device does not create any undesired dead zones therefore. Corresponding dead zones are then, if at all, present only in the immediate border regions between measuring pixels, i.e. in the regions in which there are typically walls or boundaries between adjacent measuring pixels.

Even in the case of an X-ray detector presented here the indirect converting measuring pixels expediently have a scintillator layer with walls for segregation from adjacent measuring pixels and therefore for avoiding optical, radiant or electrical crosstalk, although the walls are preferably omitted at boundary surfaces between indirect converting measuring pixels and direct converting measuring pixels. The semiconductor material of the direct converting measuring pixels assumes the function of the walls at these boundary surfaces.

The direct converting measuring pixels preferably also have a detector layer which is provided with a reflective surface at least at boundary surfaces between direct converting and indirect converting measuring pixels. This reflective surface at the direct converting measuring pixels then assumes the function of the walls at the indirect converting measuring pixels, wherein the reflective surface is typically achieved by a surface treatment or a coating which is typically less thick than a typical wall, so the expansion of the corresponding dead zone is reduced hereby.

If the reflective surface is provided by a coating then SiO2, Si3N4 or a silicide, for example WSix, is preferably used as the material for the coating.

To be able to utilize the advantages of the two measuring principles and compensate for the respective drawbacks firstly an advantageous arrangement of direct converting and indirect converting measuring pixels is a prerequisite and secondly an adapted evaluation of the measuring signals of the measuring pixels is crucial.

Firstly the measuring signals of all direct converting measuring pixels and the measuring pixels of all indirect converting measuring pixels are preferably evaluated independently of each other, wherein two independent pixel type-based data records are generated. The two data records are capable, by way of example in the case of an X-ray detector in which measuring pixel rows with direct converting measuring pixels and measuring pixel rows with indirect converting measuring pixels are mounted side by side so as to alternate in the column direction, of generating X-ray images on the basis thereof. It is preferably provided, however, that the two data records are evaluated in combination within the framework of pre-preparation and are jointly used for image reconstruction. One possibility consists in using one of the two data records as a basis and only using the other data record to ascertain correction values for the basis by way of example. Alternatively the two data records are dealt with more or less equally and used accordingly for image reconstruction, wherein in each case correction values for the other data record respectively are ascertained from the data records.

An X-ray detector 2 described by way of example below is part of a CT scanner 4 which is shown highly simplified in FIG. 1, and has a regular or matrix-like arrangement of measuring pixels 6 for covering a measuring surface 8 which is formed as the cylindrical circumferential surface.

The measuring pixels 6 are mounted side by side in a phi direction or row direction 10 on the one hand and in a z direction or column direction 12 on the other hand, so the measuring pixels 6 form measuring pixel rows 14 in row direction 10 and measuring pixel columns 16 in column direction 12. The measuring pixel rows 14 and the measuring pixel columns 16 are oriented orthogonally to each other and due to the uniform size of the measuring pixels 6, as a regular arrangement the measuring pixels 6 form a rectangular grid.

Each measuring pixel of the regular arrangement has a detector layer 18 which during operation of the CT scanner 4 faces an X-ray radiation source 20, as well as a signal processing layer 22, positioned underneath, which therefore faces away from the X-ray radiation source 20.

Whereas the signal processing layer 22 of each measuring pixel 6 is identical in terms of construction, two different variants are provided for the detector layer 18 and the regular arrangement comprises two different measuring pixel types accordingly. In the case of the first measuring pixel type, the measuring pixels 6 are constructed as indirect converting measuring pixels 24 and the detector layer 18 thereof accordingly has a scintillator layer and a light-sensitive read-out unit, such as a photodiode, respectively, according to the principle which is known per se. Alternatively the corresponding light-sensitive read-out unit is also integrated in the signal processing layer 22. In the case of the second measuring pixel type by contrast, the measuring pixels 6 are constructed as direct converting measuring pixels 26 and the detector layer 18 of these direct converting measuring pixels 26 accordingly has an X-ray-sensitive layer for generating free charge carriers, and a sensor unit for metrologically detecting the generated free charge carriers.

Both the measuring signals of the indirect converting measuring pixels 24 and those of the direct converting measuring pixels 26 are used to generate image data, in accordance with the basic principle which is known per se, wherein two-stage pre-preparation and further preparation of the measuring signals occurs here in an evaluation unit 28 of the CT scanner 4, however, according to which firstly the measuring signals of all direct converting measuring pixels 26 and the measuring signals of all indirect converting measuring pixels 24 are pre-prepared and prepared further independently of each other. In this way firstly two independent and pixel type-based data records are generated to which existing and pixel type-based correction mechanisms are applied. The two data records are then combined with each other and used jointly for image reconstruction.

The indirect converting measuring pixels 24 and the direct converting measuring pixels 26 are also arranged relative to each other in a sequence adapted to the respective intended application and in particular a periodic sequence, as is indicated in FIGS. 2 to 6. Only measuring pixels 6 of the same measuring pixel type, i.e. either indirect converting measuring pixels 24 or direct converting measuring pixels 26, are mounted side by side in each measuring pixel row 14, for the sake of clarity all measuring pixel rows 14 are illustrated by bars, and the sequence of indirect converting measuring pixels 24 and direct converting measuring pixels 26 occurs in the column direction 12.

Figure 2:
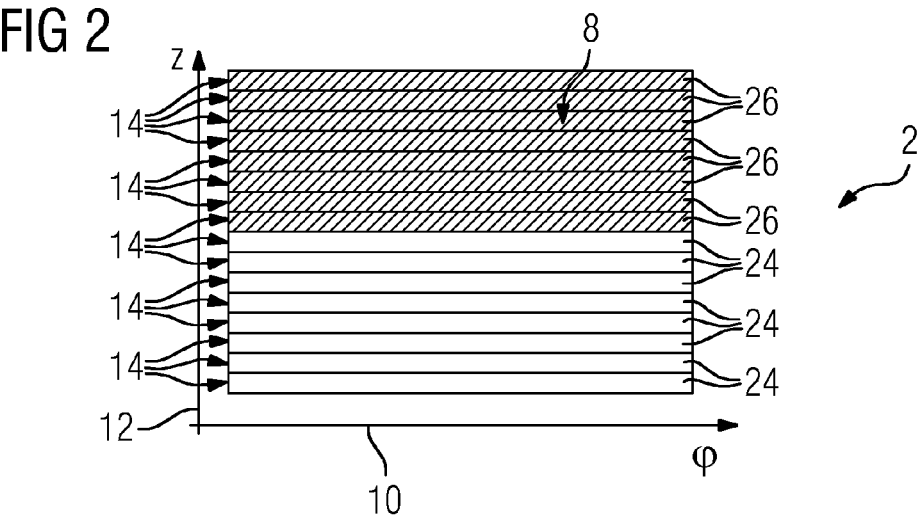
FIG. 2 shows the X-ray detector in a plan view with a first sequence of measuring pixel rows.
Figure 3:
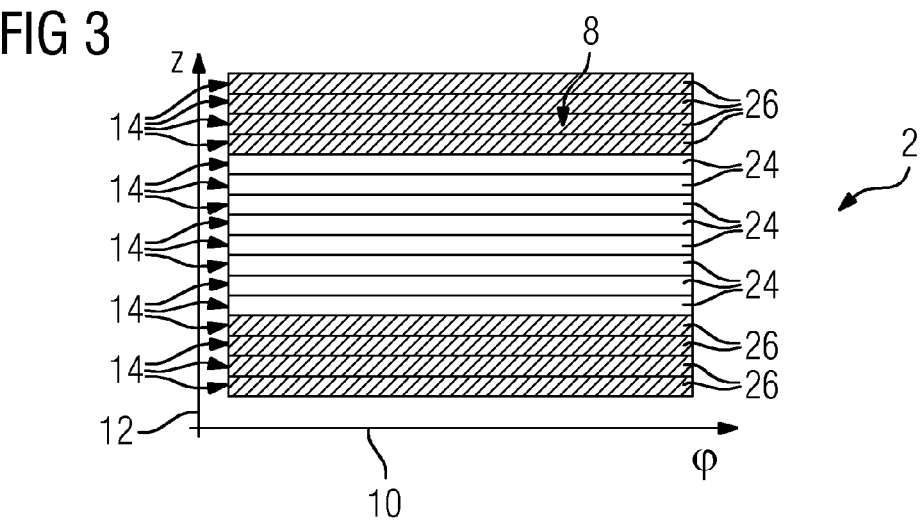
FIG. 3 shows the X-ray detector in a plan view with a second sequence of measuring pixel rows.

In the simplest case according to FIG. 2 the X-ray detector 2 is more or less divided in two, so one half of the measuring surface 8 is covered by indirect converting measuring pixels 24 and one half of the measuring surface 8 is covered by direct converting measuring pixels 26. Alternatively the measuring pixel rows 14 with indirect converting measuring pixels 24 are mounted side by side in column direction 12 and cover the central region of the measuring surface 8. The measuring pixel rows 14 with the direct converting measuring pixels 26 then frame this central region.

Figure 4:
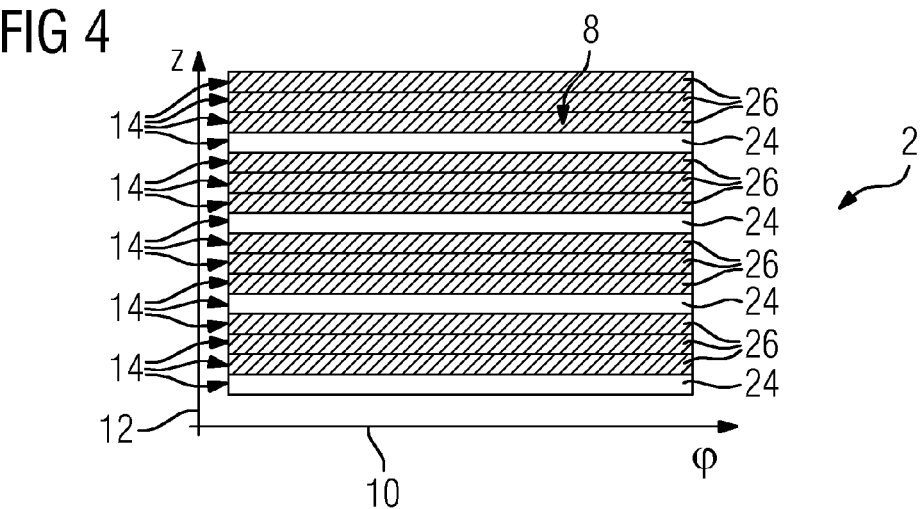
FIG. 4 shows the X-ray detector in a plan view with a third sequence of measuring pixel rows.

FIG. 4 shows a variant in which one measuring pixel row 14 respectively with indirect converting measuring pixels 24 follows three measuring pixel rows 14 with direct converting measuring pixels 26. In this case a larger portion of the measuring surface 8 is then covered by the direct converting measuring pixels 26 than by indirect converting measuring pixels 24.

Figure 5:
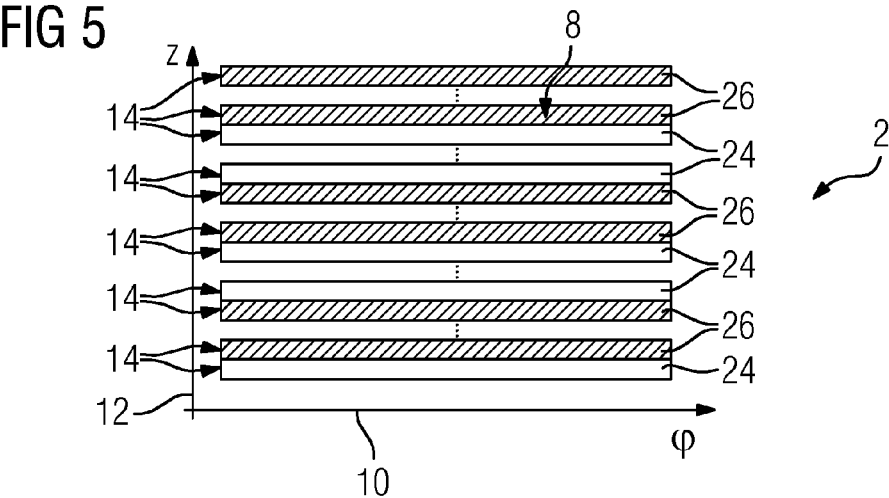
FIG. 5 shows the X-ray detector in a plan view with a fourth sequence of measuring pixel rows and FIG. 6 shows the X-ray detector in a plan view with a fifth sequence of measuring pixel rows.

Alternatively the two measuring pixel types each cover half of the measuring surface 8, wherein according to the sequence in FIG. 5 in each case a predetermined number of measuring pixel rows 14, in this case five, with indirect converting measuring pixels 24 follows an equal number of measuring pixel rows 14 with direct converting measuring pixels 26.

Figure 6:
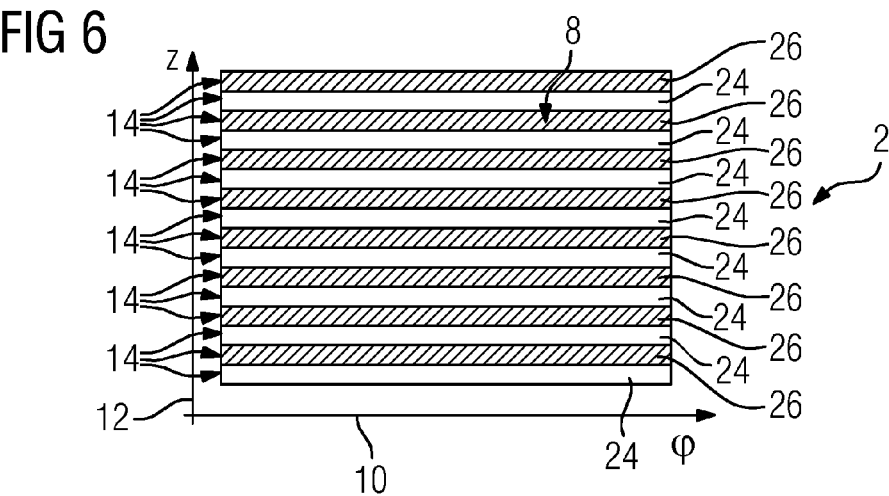

Finally FIG. 6 shows a variant in which measuring pixel rows 14 with indirect converting measuring pixels 24 and measuring pixel rows 14 with direct converting measuring pixels 26 follow each other alternately.

Figure 7:
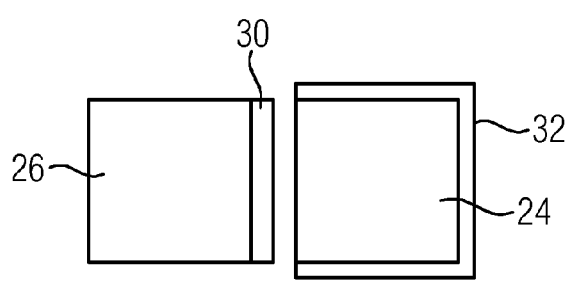
FIG. 7 shows a direct converting pixel and an adjacent indirect converting pixel.

As may be seen in FIG. 7, the direct converting measuring pixels 26 preferably also have a detector layer which is provided with a reflective surface 30 at least at boundary surfaces between direct converting 26 and indirect converting 24 measuring pixels. This reflective surface 30 at the direct converting measuring pixels 26 then assumes the function of the walls 32 at the indirect converting measuring pixels 24, wherein the reflective surface 30.

The invention is not restricted to the example embodiment described above. Instead, a person skilled in the art can derive other variants of embodiments of the invention herefrom without departing from the subject matter of the invention. In particular all individual features described in connection with the example embodiment may also be combined with each other in a different way without departing from the subject matter of the invention.

The patent claims filed with the application are formulation proposals without prejudice for obtaining more extensive patent protection. The applicant reserves the right to claim even further combinations of features previously disclosed only in the description and/or drawings.

The example embodiment or each example embodiment should not be understood as a restriction of the invention. Rather, numerous variations and modifications are possible in the context of the present disclosure, in particular those variants and combinations which can be inferred by the person skilled in the art with regard to achieving the object for example by combination or modification of individual features or elements or method steps that are described in connection with the general or specific part of the description and are contained in the claims and/or the drawings, and, by way of combinable features, lead to a new subject matter or to new method steps or sequences of method steps, including insofar as they concern production, testing and operating methods.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

Further, elements and/or features of different example embodiments may be combined with each other and/or substituted for each other within the scope of this disclosure and appended claims.

Still further, any one of the above-described and other example features of the present invention may be embodied in the form of an apparatus, method, system, computer program, tangible computer readable medium and tangible computer program product. For example, of the aforementioned methods may be embodied in the form of a system or device, including, but not limited to, any of the structure for performing the methodology illustrated in the drawings.

Even further, any of the aforementioned methods may be embodied in the form of a program. The program may be stored on a tangible computer readable medium and is adapted to perform any one of the aforementioned methods when run on a computer device (a device including a processor). Thus, the tangible storage medium or tangible computer readable medium, is adapted to store information and is adapted to interact with a data processing facility or computer device to execute the program of any of the above mentioned embodiments and/or to perform the method of any of the above mentioned embodiments.

The tangible computer readable medium or tangible storage medium may be a built-in medium installed inside a computer device main body or a removable tangible medium arranged so that it can be separated from the computer device main body. Examples of the built-in tangible medium include, but are not limited to, rewriteable non-volatile memories, such as ROMs and flash memories, and hard disks. Examples of the removable tangible medium include, but are not limited to, optical storage media such as CD-ROMs and DVDs; magneto-optical storage media, such as MOs; magnetism storage media, including but not limited to floppy disks (trademark), cassette tapes, and removable hard disks; media with a built-in rewriteable non-volatile memory, including but not limited to memory cards; and media with a built-in ROM, including but not limited to ROM cassettes; etc. Furthermore, various information regarding stored images, for example, property information, may be stored in any other form, or it may be provided in other ways.

Although the invention has been illustrated and described in greater detail by the preferred example embodiment, the invention is not restricted by the disclosed examples and other variations can be derived therefrom by the person skilled in the art, without departing from the scope of protection of the invention.

What is claimed is:

1. An X-ray detector, comprising:
    a regular arrangement of measuring pixels covering a measuring surface, the regular arrangement including two different types of measuring pixels, wherein a plurality of the measuring pixels of the regular arrangement are constructed as direct converting measuring pixels and remaining ones of the measuring pixels are constructed as indirect converting measuring pixels, and wherein at least two adjacent of rows of measuring pixels are direct converting measuring pixels, a row being a plurality of measuring pixels adjacent to one another and extending along the entire measuring surface in a direction of rotation of the x-ray detector, wherein each direct converting measuring pixel includes a detector layer, and wherein the detector layer is provided with a reflective surface at least at boundary surfaces between direct converting measuring pixels and indirect converting measuring pixels.

2. The X-ray detector of claim 1, wherein the direct converting measuring pixels and the indirect converting measuring pixels are arranged in a periodic sequence.

3. The X-ray detector of claim 2, wherein a plurality of measuring pixels are mounted side by side in a row direction to form a measuring pixel row, wherein only measuring pixels of a same type are mounted side by side in each measuring pixel row, and wherein a plurality of measuring pixel rows are mounted side by side in a column direction, orthogonal to the row direction, to form the regular arrangement of measuring pixels.

4. The X-ray detector of claim 3, wherein, viewed in the column direction, measuring pixel rows with direct converting measuring pixels and measuring pixel rows with indirect converting measuring pixels are arranged in a periodic sequence, and wherein each measuring pixel row with measuring pixels of a first type respectively follows a number of measuring pixel rows.

5. The X-ray detector of claim 3, wherein, viewed in the column direction, measuring pixel rows with direct converting measuring pixels and measuring pixel rows with indirect converting measuring pixels are arranged in a periodic sequence, and wherein, following a number of measuring pixel rows with measuring pixels of a first type, is a same number of measuring pixel rows with measuring pixels of a second type.

6. The X-ray detector of claim 3, wherein measuring pixel rows with direct converting measuring pixels and measuring pixel rows with indirect converting measuring pixels are mounted side by side so as to alternate in the column direction.

7. The X-ray detector of claim 2, wherein each measuring pixel includes a detector layer and a signal processing layer with an application-specific integrated circuit.

8. The X-ray detector of claim 2, wherein each indirect converting measuring pixel includes a scintillator layer with walls for segregation from adjacent measuring pixels, and wherein the walls are omitted at boundary surfaces between indirect converting measuring pixels and direct converting measuring pixels.

9. The X-ray detector of claim 2, further comprising an evaluation unit, the evaluation unit being configured to evaluate the measuring signals of all direct converting measuring pixels and the measuring signals of all indirect converting measuring pixels independently of each other, wherein two independent pixel type-based data records are generated, and wherein the two data records are then used for an image reconstruction.

10. The X-ray detector of claim 1, wherein a plurality of measuring pixels are mounted side by side in a row direction to form a measuring pixel row, wherein only measuring pixels of a same type are mounted side by side in each measuring pixel row, and wherein a plurality of measuring pixel rows are mounted side by side in a column direction, orthogonal to the row direction, to form the regular arrangement of measuring pixels.

11. The X-ray detector of claim 10, wherein, viewed in the column direction, measuring pixel rows with direct converting measuring pixels and measuring pixel rows with indirect converting measuring pixels are arranged in a periodic sequence, and wherein each measuring pixel row with measuring pixels of a first type respectively follows a number of measuring pixel rows.

12. The X-ray detector of claim 11, wherein the number of direct converting measuring pixel rows is three measuring pixel rows.

13. The X-ray detector of claim 10, wherein, viewed in the column direction, measuring pixel rows with direct converting measuring pixels and measuring pixel rows with indirect converting measuring pixels are arranged in a periodic sequence, and wherein, following a number of measuring pixel rows with measuring pixels of a first type, is a same number of measuring pixel rows with measuring pixels of a second type.

14. The X-ray detector of claim 10, wherein measuring pixel rows with direct converting measuring pixels and measuring pixel rows with indirect converting measuring pixels are mounted side by side so as to alternate in the column direction.

15. The X-ray detector of claim 1, wherein the direct converting measuring pixels and the indirect converting measuring pixels have the same dimensions in row direction.

16. The X-ray detector of claim 1, wherein each measuring pixel includes a detector layer and a signal processing layer with an application-specific integrated circuit.

17. The X-ray detector of claim 1, wherein each indirect converting measuring pixel includes a scintillator layer with walls for segregation from adjacent measuring pixels, and wherein the walls are omitted at boundary surfaces between indirect converting measuring pixels and direct converting measuring pixels.

18. The X-ray detector of claim 1, wherein the reflective surface is achieved with aid of a silicide.

19. The X-ray detector of claim 1, further comprising an evaluation unit, the evaluation unit being configured to evaluate the measuring signals of all direct converting measuring pixels and the measuring signals of all indirect converting measuring pixels independently of each other, wherein two independent pixel type-based data records are generated, and wherein the two data records are then used for an image reconstruction.

20. The X-ray detector of claim 1, wherein the X-ray detector is included in a computed tomography system.

21. A computed tomography system, comprising the X-ray detector of claim 1.

22. The X-ray detector of claim 1, wherein half of the measuring surface is covered by adjacent measuring pixels of a first type and half of the measuring surface is covered by adjacent measuring pixels of a second type.

23. The X-ray detector of claim 1, wherein the direct converting measuring pixels comprising a row of measuring pixels abut one another and the indirect converting measuring pixels comprising a row of measuring pixels abut one another.

* * * * *